United States Patent [19]
Viot et al.

[11] Patent Number: 5,699,488
[45] Date of Patent: Dec. 16, 1997

[54] FUNCTIONAL TESTING OF A FUZZY RULEBASE

[75] Inventors: J. Greg Viot; Thomas C. Harris, both of Austin, Tex.

[73] Assignee: Motorola, Inc., Schaumburg, Ill.

[21] Appl. No.: 364,372

[22] Filed: Dec. 27, 1994

[51] Int. Cl.⁶ ............................................. G06F 15/00
[52] U.S. Cl. ........................... 395/51; 395/3; 395/61
[58] Field of Search ..................... 371/27, 23; 395/51.3, 395/61

[56] References Cited

PUBLICATIONS

Harris, Thomas Chance and Viot, J. Greg; "Functional Testing of a Fuzzy Rulebase," published in Conference Proceeding Fuzzy Logic 1994 held Sep. 13–15, 1994; pp. 239 through 244.

Togai Infralogic's Descriptive Document, downloaded from www.ortech.engr.com, Aug. 13, 1996.

Su et al. "Multiple path Sensitization for hierarchical circuit testing," Test Conference, 1990 Proceeding, Dec. 30, 1990.

*Primary Examiner*—Tariq R. Hafiz
*Assistant Examiner*—Ji-Yong D. Chung

[57] ABSTRACT

A data processing system for testing a rulebase implemented in a rule evaluation process utilized for transforming fuzzy inputs to fuzzy outputs in a fuzzy logic operation, the rule evaluation process including a plurality of rules, wherein a path in the fuzzy logic operation includes one of the fuzzy inputs specified by the path, one of the plurality of rules specified by the path, and one of the fuzzy outputs specified by the path, wherein the rule evaluation process implements a MIN/MAX method of rule evaluation. The system determines which paths in the fuzzy logic operation can be tested simultaneously, and assigns values to test vectors in order to test the paths in a manner consistent with the determination of which paths in the fuzzy logic operation can be tested simultaneously, wherein paths that can be tested simultaneously can be tested by a same test vector.

20 Claims, 6 Drawing Sheets

RULES:
e: IF a AND b THEN h
f: IF b AND c THEN h AND i
g: IF c AND d THEN i

FUNCTIONAL TESTING OF A FUZZY RULEBASE

FIELD OF THE INVENTION

This invention relates generally to a data processing system, and more particularly to a system and method for testing a rulebase implemented within a fuzzy logic operation in a data processing system.

BACKGROUND OF THE INVENTION

Data processors have been developed to function as binary machines whose inputs and outputs are interpreted as ones or zeroes, and no other possibilities may exist. While this works well in most situations, sometimes an answer is not simply "yes" or "no," but somewhere in between. A concept referred to as "fuzzy logic" was developed to enable data processors based on binary logic to provide an answer between "yes" and "no".

Fuzzy logic is a logic system which has membership functions with fuzzy boundaries. Membership functions translate subjective expressions, such as "a temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, if a range of temperatures provide the membership functions, an input temperature may fall in the overlapping areas of both the functions labeled "cool" and "warm." Further processing would then be required to determine a degree of membership in each of the membership functions (i.e. the degree to which the current temperature fits into each of the membership sets cool and warm).

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception.

After the fuzzification step, a step referred to as rule evaluation is executed. During the rule evaluation step, rule expressions that depend on fuzzy input values are evaluated to derive fuzzy outputs. For example, assume a rule to be evaluated may be stated as:

If (Temperature is warm) and (Pressure is high), then (Fan speed is medium).

In this rule, two antecedents, "Temperature is warm" and "Pressure is high" must be evaluated to determine a rule strength of the consequence, "Fan speed is medium." During the rule evaluation step, the degree to which an antecedent is true affects the degree to which the rule is true. The minimum of the antecedents is applied as the rule strength of the consequence of the rule. Therefore, if more than one rule is evaluated, and the fan is given more than one instruction, the rule strengths of the consequences of each of the rules are collectively used to determine an action of the fan. For example, the rule provided above may be evaluated to have a rule strength of X. Additionally, a second rule is evaluated to turn the fan on at a high speed with a rule strength of Y, where Y is greater than X. A last step in a fuzzy logic operation is to provide an appropriate action in response to the fuzzy outputs provided by the rule evaluation step.

The last step in the logic process is referred to as "defuzzification." This step resolves competing results of the rule evaluation step into a single action. Defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article was published in the April 1992 issue of AI EXPERT on pages 25 through 31.

Figure 1:
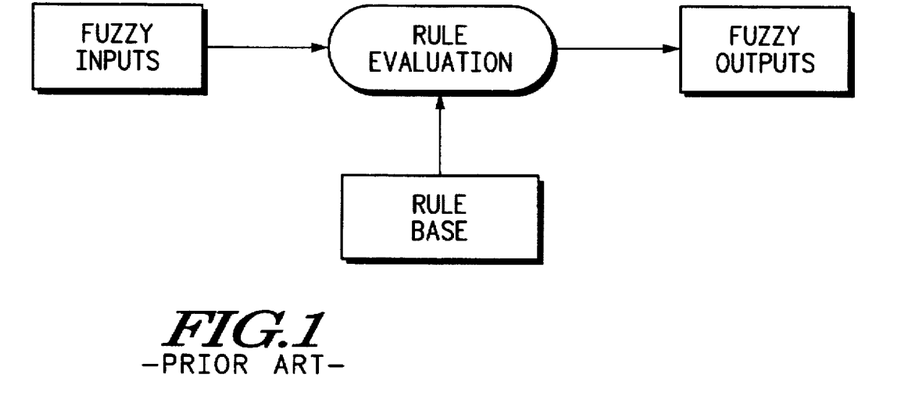
FIG. 1 illustrates a portion of a fuzzy logic system.
Figure 2:
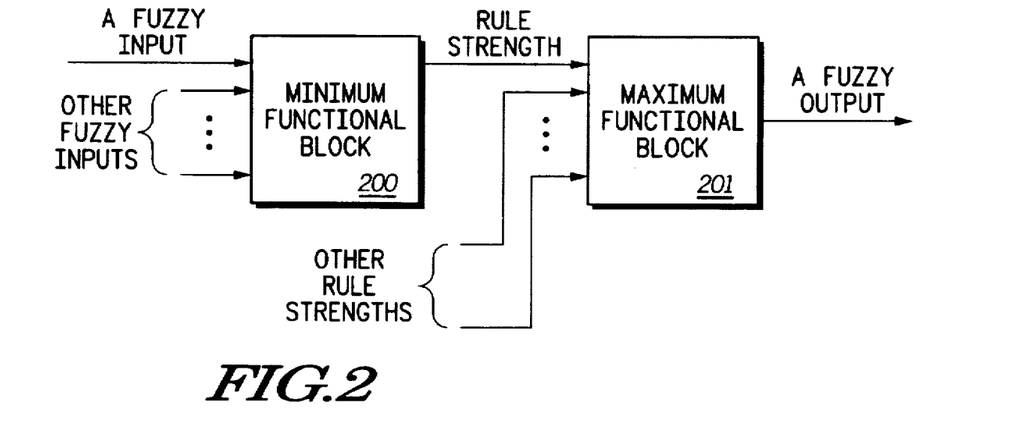
FIG. 2 illustrates a connection path within a fuzzy logic system.

As illustrated in FIG. 1, the rule evaluation process can be viewed as a transformation of fuzzy inputs to fuzzy outputs. The rules and the rulebase specify which fuzzy inputs combine to form which fuzzy outputs. A typical method of rule evaluation is the MIN/MAX method of rule evaluation, which is illustrated in FIG. 2. A fuzzy input entering a MIN functional block 200 is evaluated with other fuzzy inputs to determine a rule strength. The rule strength will take on the minimum of the various fuzzy inputs entering the MIN functional block 200. The rule strength is then passed to a MAX functional block 201 where it is evaluated with other rule strengths to form a fuzzy output. The fuzzy output will take on a maximum value of the various rule strengths entering the MAX functional block 201.

Each rule in a fuzzy rulebase implies connections between certain fuzzy inputs and certain fuzzy outputs. Connections may be implemented in hardware, software, or some combination of both. Adaptive systems may permit connections to change during the operational life of the fuzzy system.

Regardless of the hardware/software mix used to implement the connections implied by the implemented rulebase, there is a desire to verify the existence and accuracy of such connections. Thus, there is a need in the art for a system and/or method for verifying the connections implied by a rulebase within a fuzzy logic system.

SUMMARY OF THE INVENTION

The present invention fulfills the previously mentioned need by implementing a test generation process that verifies the connections implemented within a rulebase of a fuzzy logic system. The present invention generates a set of fuzzy input values, referred to herein as test vectors, in order to test each path implemented within the fuzzy logic system, wherein a path includes a fuzzy input, a rule, and a fuzzy output coupled together through the rulebase. In a preferred embodiment of the present invention, test vectors are generated that are capable of simultaneously testing two or more paths. An advantage of the present invention is that it derives a set of test vectors so as to reduce the number of tests needed to verify all of the paths within the fuzzy logic system.

More specifically, the present invention implements a data processing system for testing a rulebase implemented in a rule evaluation process utilized for transforming fuzzy inputs to fuzzy outputs in a fuzzy logic operation. The rule evaluation process comprises a plurality of rules, wherein a path in the fuzzy logic operation comprises one of the fuzzy inputs specified by the path, one of the plurality of rules specified by the path, and one of the fuzzy outputs specified by the path, wherein the rule evaluation process implements a MIN/MAX method of rule evaluation. The data processing system determines which paths in the fuzzy logic operation can be tested simultaneously, wherein the path can be tested when (1) the one of the fuzzy inputs specified by the path is less than all other fuzzy inputs feeding into the one of the plurality of rules specified by the path and (2) a strength of the one of the plurality of rules specified by the path is greater than all other rules feeding into the one of the fuzzy outputs specified by the path; and, the data processing system assigns values to test vectors in order to test the paths in a manner consistent with the determination of which paths in the fuzzy logic operation can be tested simultaneously, wherein paths that can be tested simultaneously can be tested by a same test vector.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFERRED EMBODIMENT

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Path Sensitization

Figure 3:
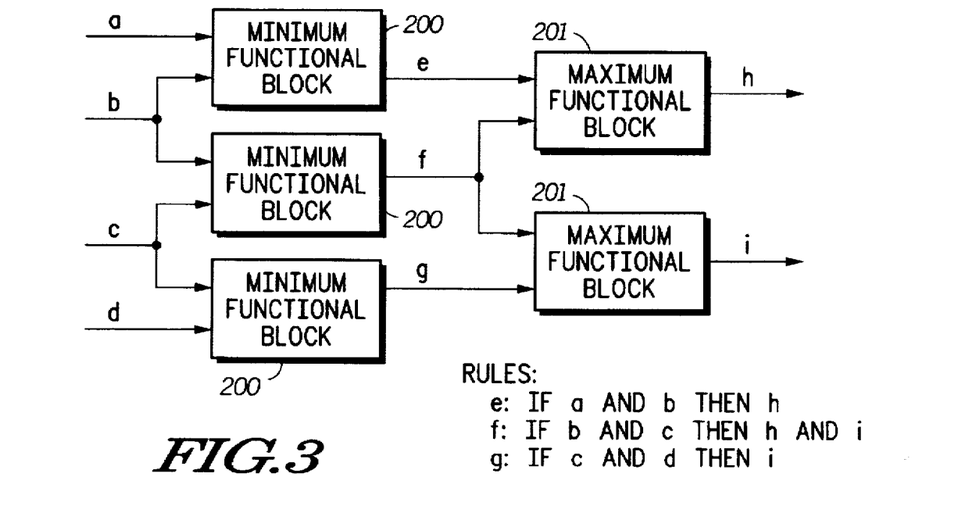
FIG. 3 illustrates path sensitization within a fuzzy logic system.

As briefly described above with respect to FIG. 2, a connection, or path, within a fuzzy logic system comprises a fuzzy input, a rule strength associated with the fuzzy input, and a fuzzy output associated with the rule strength. "Sensitizing" the path permits the fuzzy input to propagate through the rule to the fuzzy output. To sensitize a path (within an implementation of a MIN/MAX rule evaluation method): 1) the path-specified fuzzy input must be less than all other fuzzy inputs feeding into the path-specified rule, and 2) the strength of this rule must be greater than all other rules feeding into the path-specified fuzzy output. FIG. 3 illustrates the rule evaluation paths implied by the rules e, f, and g. This system has 4 fuzzy inputs (a, b, c, d), 3 rules (e, f, g), and 2 fuzzy outputs (h, i). To sensitize a path (for example c-f-h), values for the fuzzy inputs can be set as follows: c=1, b=2, a=0, d=0. Although this assignment accomplishes the goal of propagating input c to output h, many other solutions exist. Unlike binary circuits, fuzzy values can take on a range of values. In an 8-bit system, for example, each fuzzy value (fuzzy input, fuzzy output, or rule strength) can be assigned values ranging from 0 to 255. However, if an objective is to merely verify one path at a time, then there is only a need to make use of any 3 values within this range. And, the following heuristic can be applied:

if a fuzzy input is path-specified, then assign the fuzzy input=1;

else if the fuzzy input feeds into the path-specified rule, then assign the fuzzy input=2;

else assign the fuzzy input=0.

But if multiple paths are to be sensitized at a time, then having the full range of values from which to select would be useful.

By applying the single-path approach to the fuzzy logic system illustrated in FIG. 3, eight test vectors are generated:

| Path to be verified | Test Vector (a,b,c,d) |
| --- | --- |
| a-e-h | (1,2,0,0) |
| b-e-h | (2,1,0,0) |
| b-f-h | (0,1,2,0) |
| b-f-i | (0,1,2,0) |
| c-f-h | (0,2,1,0) |
| c-f-i | (0,2,1,0) |
| c-g-i | (0,0,1,2) |
| d-g-i | (0,0,2,1) |

Since the test vectors (0,1,2,0) and (0,2,1,0) each verify two paths, the number of unique test vectors is 6. A multiple-path approach could determine if a smaller test set (<6 vectors) exists with the same test coverage.

Multiple-Path Sensitization

The single-path sensitization approach quickly generates test vectors capable of verifying all intended paths. However, it does not take advantage of multiple fuzzy output ports. The present invention implements a more sophisticated approach capable of sensitizing multiple paths simultaneously (with the same test vector). The multiple-path approach is possible because there are several fuzzy output ports to which multiple fuzzy inputs can be propagated. Using the multiple-path approach permits smaller test sets to be generated, but with the same coverage.

Figure 4:
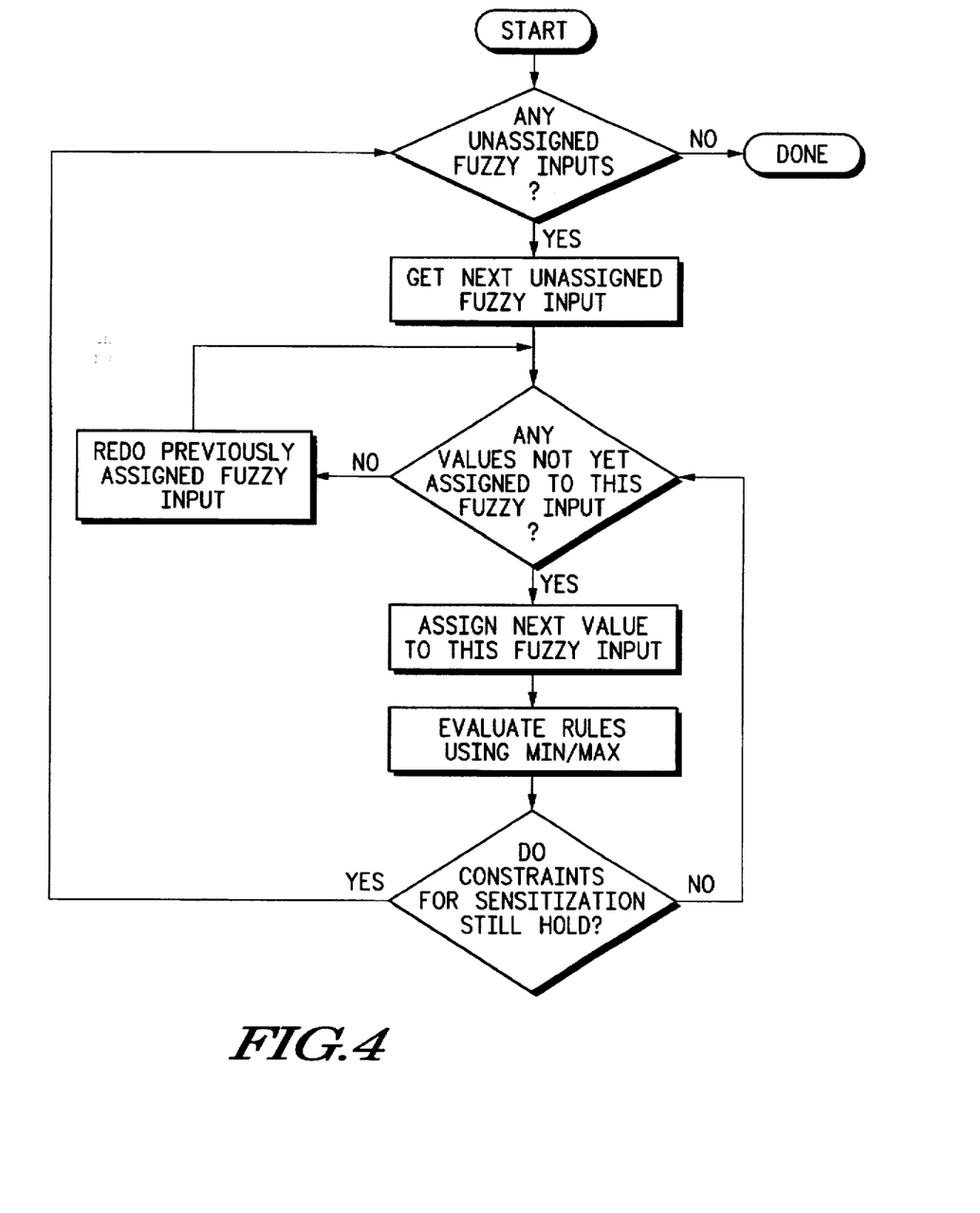
FIG. 4 illustrates a flow diagram of a process for generating test vectors.

Multiple-path sensitization involves two processes. First, there is performed a determination of which paths can be and should be sensitized simultaneously (grouped) in order to yield a sufficiently small set of test vectors. And, second, a determination is made of the values of vectors that accomplish the desired sensitization. Assigning values to vectors can be accomplished by the process illustrated in FIG. 4.

Figure 5:
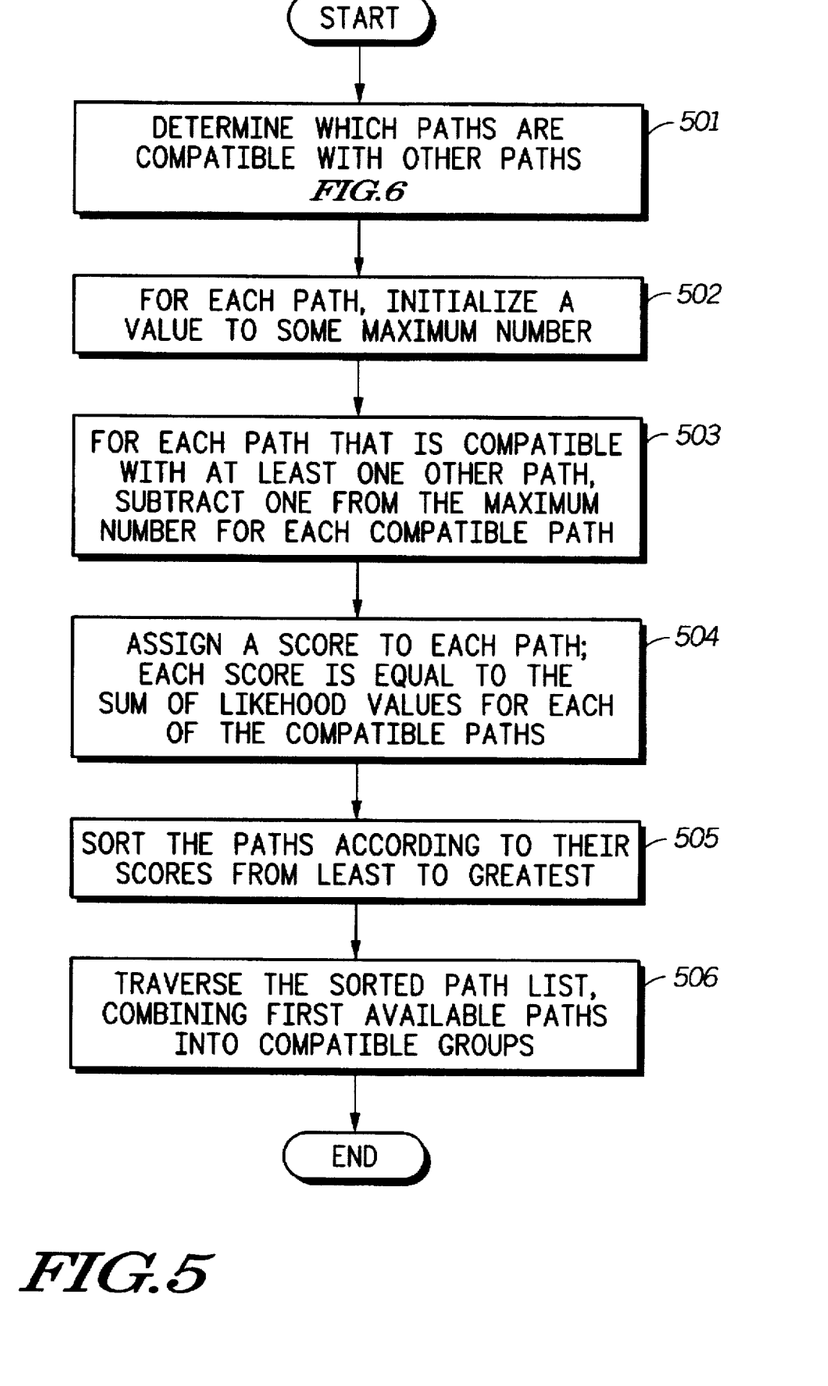
FIG. 5 illustrates a flow diagram of a process for grouping compatible paths.

Referring next to FIG. 5, the "grouping" procedure mentioned above involves the following process. First, in step 501, a determination is made as to which paths are compatible with each other (compatible paths can be tested by the same test vector; see FIG. 6).

Then, a "likelihood" value is assigned to each path. In step 502, a value for each path is initialized to some maximum number (e.g., the total number of paths in the rulebase). In step 503, 1 is subtracted from this number for each path that is compatible. The resulting number measures the likelihood that a given compatible path will be grouped with this particular path. For example, suppose Path A is compatible with either Path B or C, but not both. In some sense, B and C are competing against each other to be grouped with A. And, the more paths that are compatible with A, the less likely any given compatible path will be grouped with A, because of the higher level of competition.

A rough analogy to probability can be made to further clarify the intent of steps 502 and 503. If a finite set of elements from a population is randomly selected, the larger the population, then the lower the probability that a given element will be selected.

In step 504, each path is scored. As a result of steps 502 and 503, each path has some likelihood value associated with it. To get a measure of how likely a path is to be grouped with any path, the likelihood values associated with each path's compatible paths are summed. The higher the accumulated number, the more likely the path is to be grouped with one or more paths.

In step 505, the paths are sorted from least to greatest, according to their tallied score from step 504. With the paths sorted in this order, the grouping process can be biased to favor those paths less likely to be grouped. The ultimate goal is to group as many paths as possible so that a sufficiently small number of groups are formed.

Thereafter, in step 506, groups of compatible paths are formed by traversing the sorted path list from start to end, combining first available paths into compatible groups, but not exceeding the maximum limit allowed per group. This maximum per group limit is set by the number of fuzzy outputs. In other words, the number of paths that can be simultaneously sensitized is limited by the number of fuzzy output ports in the system.

For the fuzzy logic system example illustrated in FIG. 3, the following table presents an example of the aforementioned values, scores, sorted rank, grouping, etc. derived during implementation of the process illustrated in FIG. 5.

| Path # | Path | Compatible Paths | Likelihood Value | Score | Sorted Rank | Group # |
|---|---|---|---|---|---|---|
| 1 | a-e-h | 6,7 | 6 | 11 | 5 | 4 |
| 2 | b-e-h | 6,7,8 | 5 | 16 | 7 | 5 |
| 3 | b-f-h | 7,8 | 6 | 10 | 3 | 3 |
| 4 | b-f-i |  | 8 | 0 | 1 | 1 |
| 5 | c-f-h |  | 8 | 0 | 2 | 2 |
| 6 | c-f-i | 1,2 | 6 | 10 | 4 | 4 |
| 7 | c-g-i | 1,2,3 | 5 | 16 | 8 | 5 |
| 8 | d-g-i | 2,3 | 6 | 11 | 6 | 3 |

Determining Compatible Paths

As indicated above, compatible paths are paths whose combined sensitization constraints do not inhibit simultaneous sensitization, and therefore, can be tested with the same test vector. Returning to FIG. 3, it would be expected that paths a-e-h and d-g-i are compatible because they appear to be independent of each other. However, it turns out that they cannot both be sensitized because of constraint conflicts. Therefore, a non-trivial examination of the path constraints is required to determine compatibility relationships.

Figure 6:
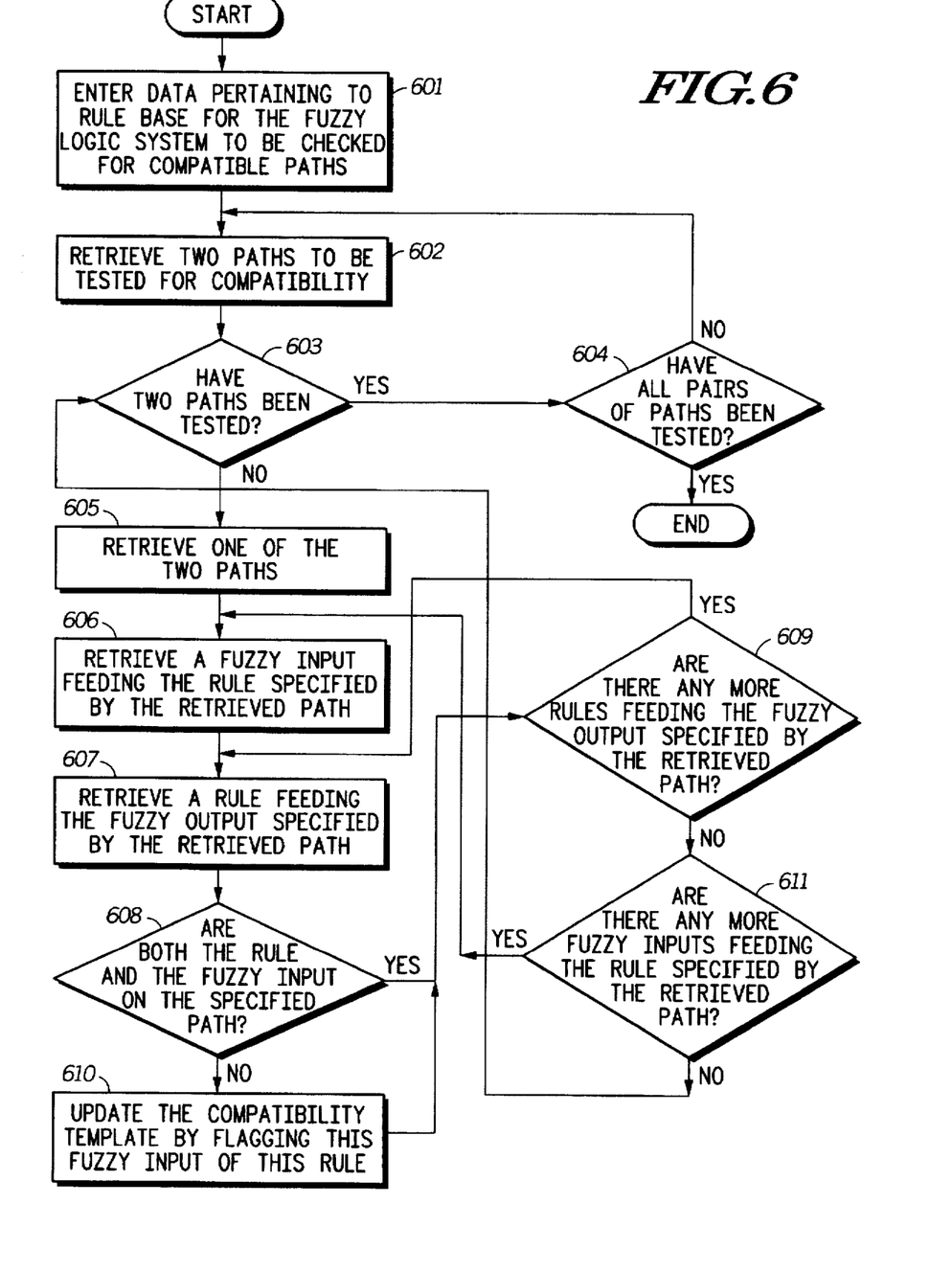
FIG. 6 illustrates the process for determining compatible paths.
Figure 7:
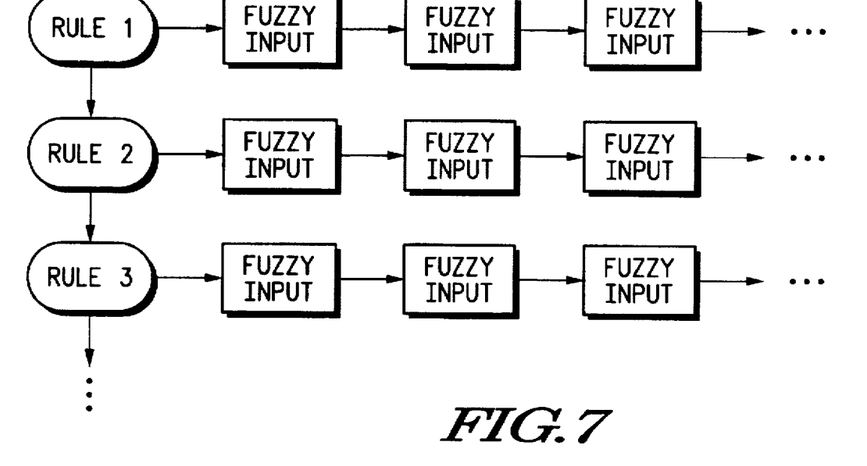
FIG. 7 illustrates a compatibility template.

Referring next to FIG. 6, there is illustrated a process implemented within the present invention in order to determine which paths within the rulebase are compatible, i.e., the paths can be tested with the same test vector. In step 601, data pertaining to the rulebase may be entered into the system. This data may include the fuzzy inputs, the fuzzy outputs and the rulebase associating the fuzzy inputs to the fuzzy outputs. In a preferred embodiment of the present invention, a compatibility template, represented in FIG. 7, can be constructed and stored within memory (e.g., ROM 16) of the data processing system 13 (see FIG. 9). The compatibility template generally comprises a list of the rules within the rulebase, and for each rule, a list of fuzzy inputs associated with the rule. Each list of fuzzy inputs represents possible values that the particular associated rule can assume.

The remainder of the process illustrated in FIG. 6 is implemented to systematically "mark out" certain fuzzy inputs when a set of paths are being tested for compatibility. If any of the rules in the compatibility template have all of their fuzzy inputs "marked out", then the set of paths being considered are not compatible.

In step 602, two paths from the rulebase are retrieved in order to be tested for compatibility. More than two paths from the rulebase may be tested for compatibility by utilizing a process similar to the one described herein with respect to FIG. 6. For example, in step 506 of FIG. 5, groups of 2 or more can be formed. The size of these groups are limited by the number of fuzzy output ports. Next, in step 603, the system determines whether or not the two paths have already been tested. If they have, then the process proceeds to step 604, where a determination is made whether or not all of the pairs of paths within the rulebase have been tested. If all of the possible pairs of paths in the rulebase have been tested, the process then ends, otherwise, the process returns to step 602 to retrieve another two paths from the rulebase.

Once two paths have been retrieved that have not been previously tested, the process proceeds from step 603 to step 605 to begin a series of tests for one of the two paths retrieved. Thereafter, in step 606, one of the fuzzy inputs feeding the rule specified by the retrieved path is then focused upon. In step 607, another embedded loop is entered, wherein the focus is placed upon a particular rule feeding the fuzzy output specified by the retrieved path.

Next, in step 608, a determination is made whether or not both the specified rule (step 607) and the specified fuzzy input (step 606) reside on the path specified in step 605. If they are, the process proceeds to step 609 to determine whether or not there are any more rules feeding the fuzzy output specified by the retrieved path. If yes, the process returns to step 607 to specify another rule feeding the fuzzy output specified by the path specified in step 605.

If in step 608 it is determined that both the rule specified in step 607 and the fuzzy input specified in step 606 are not both on the path specified in step 605, then the process proceeds to step 610 to update the compatibility template by inserting a flag in association with the fuzzy input specified in step 606. From step 610, the process proceeds to step 609, described above. From step 609, if there are no more rules specified, which feed the fuzzy output specified by the path specified in step 605, the process transfers to step 611 to determine whether or not there are any more fuzzy inputs feeding the rule specified by the path specified in step 605. If there are, the process returns to step 606 to specify another fuzzy input feeding the rule specified by the path specified in step 605. However, if there are no more fuzzy inputs feeding the rule specified by the path specified in step 605, the process returns to step 603 to determine whether or not both paths to be tested for compatibility have been tested.

When the process illustrated in FIG. 6 is applied to the fuzzy logic system illustrated in FIG. 3, the listing of compatible paths is as indicated in the above table.

As it is well documented above, the present invention derives a set of test vectors capable of testing a fuzzy logic system, such as the one illustrated in FIG. 3, to verify all of the paths associating fuzzy inputs to fuzzy outputs via the rulebase. One of the goals of the present invention is to derive a sufficiently small number of test vectors in order to minimize the computational requirements, such as time for testing, needed for verifying the various connections within the fuzzy logic system.

Figure 8:
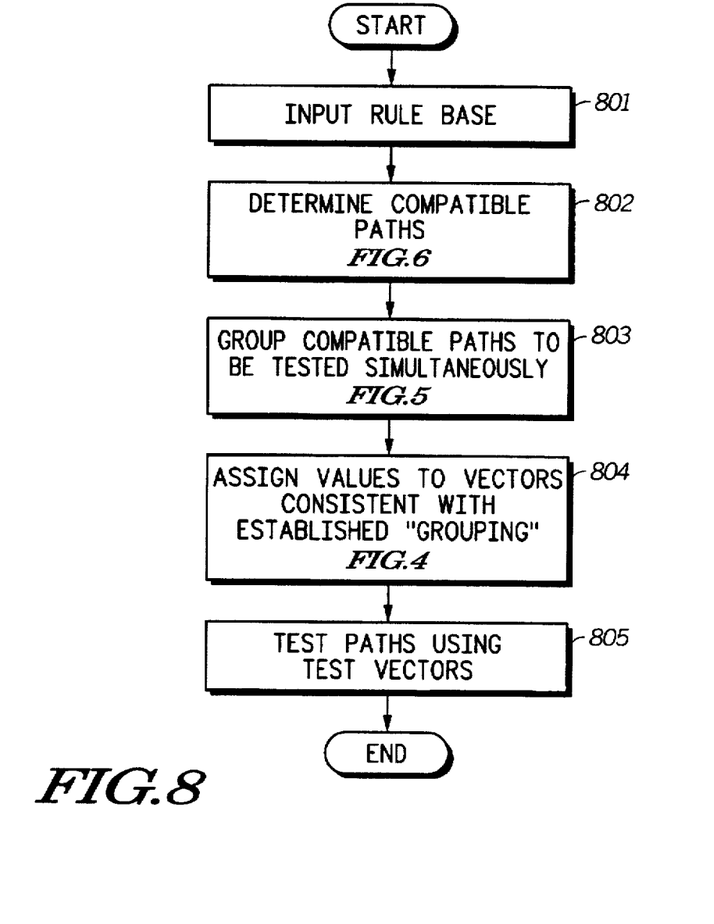
FIG. 8 illustrates a flow diagram for verifying connections within a fuzzy logic system.

In summary, referring next to FIG. 8, the present invention begins the process of creating these test vectors by first inputting data pertaining to the rulebase and the fuzzy logic system (step 801). Next, in step 802, a determination is made of the compatible paths within the fuzzy logic system, preferably using the process illustrated in FIG. 6. Thereafter, in step 803, the process of FIG. 5 is preferable utilized to group the paths. In step 804, values are assigned to the test vectors (FIG. 4), which are consistent with the "grouping" established through the process of FIG. 5. In step 805, the test vectors may then be used to verify the various paths within the fuzzy logic system.

Fuzzy logic operations may be implemented within software implemented in a data processing system or through the use of dedicated hardware, or some combination of software and hardware, such as a microcoded or firmware implementation. The present invention may also be implemented within dedicated hardware or within processes implemented within a data processing system 13.

Figure 9:
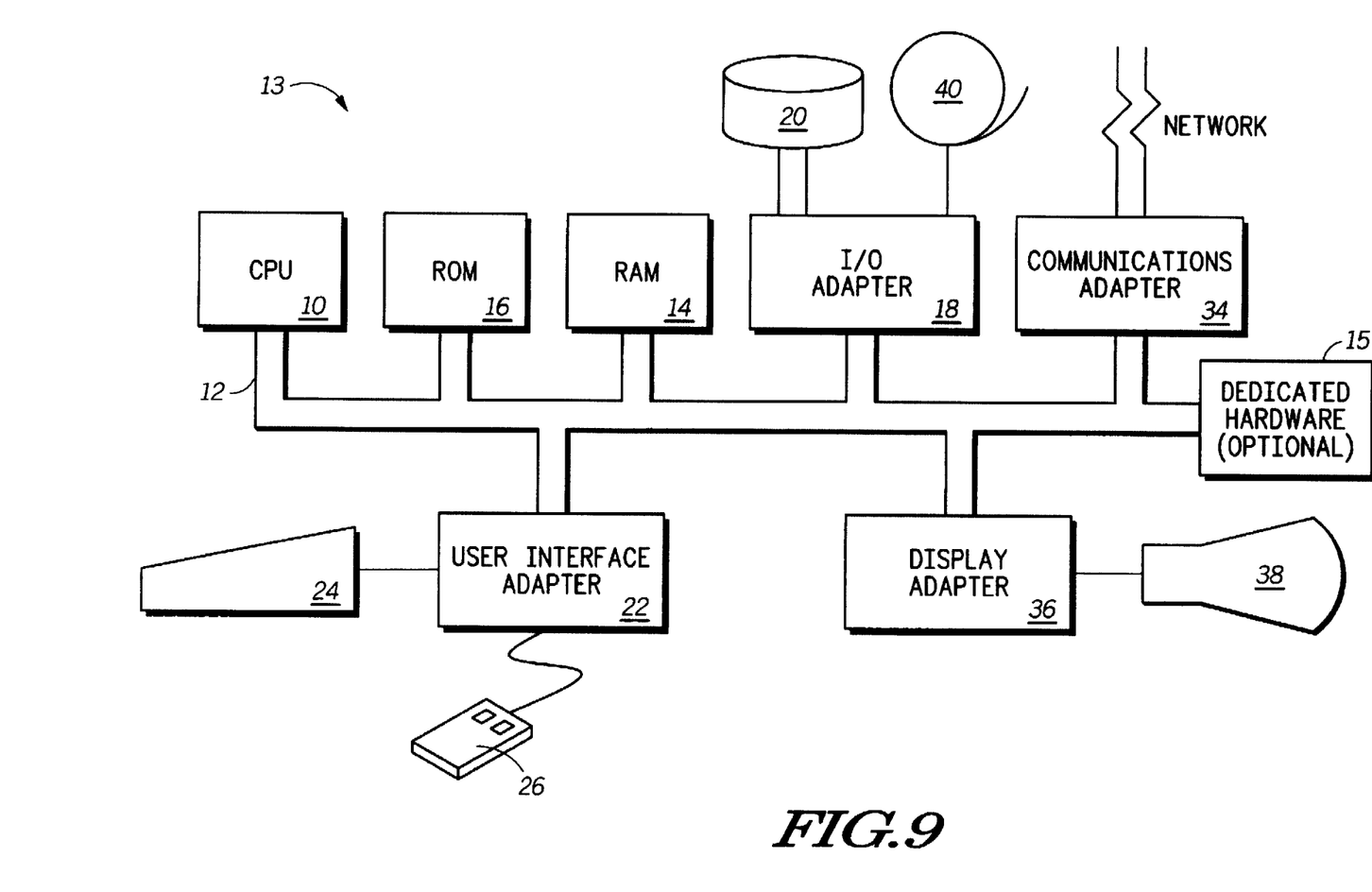
FIG. 9 illustrates a data processing system configurable for implementing the present invention.

A representative data processing system 13 for practicing the present invention is depicted in FIG. 9, which illustrates a typical hardware configuration of a workstation in accordance with the subject invention having central processing unit 10, such as a conventional microprocessor, and a number of other units interconnected via system bus 12. The workstation shown in FIG. 9 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, and/or other user interface devices such as a touch screen device (not shown) to bus 12, communication adapter 34 for connecting the workstation to a data processing network, and display adapter 36 for connecting bus 12 to display device 38. The present invention, as it is represented in FIG. 8, may be stored in disk units 20, tape drives 40, and/or RAM 14, or made available to system 13 via a network connection through communications adapter 34, and thereafter processed via CPU 10.

Note, the present invention may be implemented within data processing system 13 and/or dedicated hardware 15 that is separate and apart from the data processing system, or dedicated hardware, implementing the fuzzy logic system to be tested.

Although the present invention and its advantages have been described in detail, it should be understood that various changes, substitutions and alterations can be made herein without departing from the spirit and scope of the invention as defined by the appended claims.

We claim:

1. A data processing system for testing a rulebase implemented in a rule evaluation process utilized for transforming fuzzy inputs to fuzzy outputs in a fuzzy logic operation, said rule evaluation process comprising a plurality of rules, wherein a path in said fuzzy logic operation comprises one of said fuzzy inputs specified by said path, one of said plurality of rules specified by said path, and one of said fuzzy outputs specified by said path, wherein said rule evaluation process implements a MIN/MAX method of rule evaluation, said system comprising:

means for determining which paths in said fuzzy logic operation can be tested simultaneously, wherein said path can be tested when (1) said one of said fuzzy inputs specified by said path is less than all other fuzzy inputs feeding into said one of said plurality of rules specified by said path and (2) a strength of said one of said plurality of rules specified by said path is greater than all other rules feeding into said one of said fuzzy outputs specified by said path; and means for assigning values to test vectors stored in a memory in order to test said paths in a manner consistent with said determination of which paths in said fuzzy logic operation can be tested simultaneously, wherein paths that can be tested simultaneously can be tested by a same test vector.

2. The system as recited in claim 1, wherein said means for determining which paths in said fuzzy logic operation can be tested simultaneously with said same test vector produces a number of said test vectors that is less than a number of test vectors that would be required to individually test each one of said paths in said fuzzy logic operation.

3. The system as recited in claim 1, further comprising:

means for assigning a likelihood value to each one of said paths in said fuzzy logic operation, wherein said likelihood value measures a likelihood that another path will be grouped with said each one of said paths in said fuzzy logic operation.

4. The system as recited in claim 3, wherein said means for assigning a likelihood value to each one of said paths in said fuzzy logic operation further comprises:

means for initializing a value for each of said paths in said fuzzy logic operation; and for each one of said paths in said fuzzy logic operation, means for subtracting 1 from said initialized value for each path that is compatible with said each one of said paths in said fuzzy logic operation.

5. The system as recited in claim 4, further comprising:

means for assigning a score to said each one of said paths in said fuzzy logic operation, wherein said score equals a sum of said likelihood values assigned to those paths that can be tested simultaneously with said same test vector with said each one of said paths in said fuzzy logic operation.

6. The system as recited in claim 5, further comprising:

means for sorting said each one of said paths in said fuzzy logic operation according to said assigned scores.

7. The system as recited in claim 6, further comprising:

means for traversing said sorted paths; and means for combining first available sorted paths into groups of paths that can be tested simultaneously with said same test vector, wherein a maximum number of paths per group may not exceed a number of said fuzzy outputs.

8. The system as recited in claim 1, further comprising:

means for sorting said paths in an order from a most difficult to group to a least difficult to group, wherein two or more paths may be grouped if it has been determined by said determining means that said two or more paths can be tested simultaneously with said same test vector; and means for grouping said sorted paths, according to said order, into groups of paths that can be tested simultaneously with said same test vector, wherein a number of said paths in each of said groups is limited to a number of said fuzzy outputs in said fuzzy logic operation.

9. The system as recited in claim 1, wherein said means for determining which paths in said fuzzy logic operation can be tested simultaneously with said same test vector further comprises:

storage means for storing a template comprising a listing of said plurality of rules and said fuzzy inputs corresponding to each of said plurality of rules;

for two or more of said paths to be evaluated to determine if said two or more of said paths can be tested simultaneously with said same test vector, means for flagging a particular one of said fuzzy inputs, stored within said storage means and feeding said plurality of rules contained within said two or more of said paths, when it is determined that a particular one of said plurality of rules contained within said two or more of said paths cannot assume a rule strength equal to a value of said particular one of said fuzzy inputs feeding said plurality of rules contained within said two or more of said paths; and means for determining that said two or more of said paths to be evaluated cannot be tested simultaneously with said same test vector when all of said fuzzy inputs pertaining to at least one of said plurality of rules have been flagged by said flagging means.

10. A method for testing a rulebase implemented in a rule evaluation process utilized for transforming fuzzy inputs to fuzzy outputs in a fuzzy logic operation performed in a data processing system, said rule evaluation process comprising a plurality of rules, wherein a path in said fuzzy logic operation comprises (i) one of said fuzzy inputs specified by said path, (ii) one of said plurality of rules specified by said path, and (iii) one of said fuzzy outputs specified by said path, said testing method comprising the steps of:

determining which paths in said fuzzy logic operation can be tested simultaneously with a same test vector, wherein a path can be tested when (1) said one of said fuzzy inputs specified by said path is less than all other fuzzy inputs feeding into said one of said plurality of rules specified by said path and (2) a strength of said one of said plurality of rules specified by said path is greater than all other rules feeding into said one of said fuzzy outputs specified by said path; and assigning values to test vectors stored in a memory in order to test said paths in a manner consistent with said determination of which paths in said fuzzy logic operation can be tested simultaneously with said same test vector.

11. The testing method as recited in claim 10, further comprising the step of:

assigning a likelihood value to each one of said paths in said fuzzy logic operation, wherein said likelihood value measures a likelihood that another path will be grouped with said each one of said paths in said fuzzy logic operation.

12. The testing method as recited in claim 11, wherein said step of assigning a likelihood value to each one of said paths in said fuzzy logic operation further comprises the steps of:

initializing a value for each of said paths in said fuzzy logic operation; and for each one of said paths in said fuzzy logic operation, subtracting 1 from said initialized value for each path that is compatible with said each one of said paths in said fuzzy logic operation.

13. The testing method as recited in claim 12, further comprising the step of:

assigning a score to said each one of said paths in said fuzzy logic operation, wherein said score equals a sum of said likelihood values assigned to those paths that can be tested simultaneously with said same test vector with said each one of said paths in said fuzzy logic operation.

14. The testing method as recited in claim 13, further comprising the steps of:

sorting said each one of said paths in said fuzzy logic operation according to said assigned scores;

traversing said sorted paths; and combining first available sorted paths into groups of paths that can be tested simultaneously with said same test vector, wherein a maximum number of paths per group may not exceed a number of said fuzzy outputs.

15. The testing method as recited in claim 10, further comprising the steps of:

sorting said paths in an order from a most difficult to group to a least difficult to group, wherein two or more paths may be grouped if it has been determined that said two or more paths can be tested simultaneously with said same test vector; and grouping said sorted paths, according to said order, into groups of paths that can be tested simultaneously with said same test vector, wherein a number of said paths in each of said groups is limited to a number of said fuzzy outputs in said fuzzy logic operation.

16. The testing method as recited in claim 10, wherein said step of determining which paths in said fuzzy logic operation can be tested simultaneously with said same test vector further comprises the steps of:

for two or more of said paths to be evaluated to determine if said two or more of said paths can be tested simultaneously with said same test vector, flagging a particular one of said fuzzy inputs feeding said plurality of rules contained within said two or more of said paths when it is determined that a particular one of said plurality of rules contained within said two or more of said paths cannot assume a rule strength equal to a value of said particular one of said fuzzy inputs feeding said plurality of rules contained within said two or more of said paths; and determining that said two or more of said paths to be evaluated cannot be tested simultaneously with said same test vector when all of said fuzzy inputs pertaining to at least one of said plurality of rules have been flagged.

17. The testing method as recited in claim 10, wherein said step of determining which paths in said fuzzy logic operation can be tested simultaneously with said same test vector further comprises the steps of:

(1) for a first path in a plurality of said paths in said fuzzy logic operation, (A) for each fuzzy input feeding said one of said plurality of rules specified by said first path, (i) for each rule feeding said one of said fuzzy outputs specified by said first path, (a) if both said one of said plurality of rules specified by said first path and said each fuzzy input feeding said one of said plurality of rules specified by said first path are on said first path, return to (i), otherwise flag said each fuzzy input feeding said one of said plurality of rules specified by said first path;

(2) return to (i) if there are more rules feeding said one of said fuzzy outputs specified by said first path, otherwise return to (A) if there are more fuzzy inputs feeding said one of said plurality of rules specified by said first path, otherwise return to (1) to perform (A), (i), (a) and (2) on any remaining paths in said plurality of said paths in said fuzzy logic operation; and (3) designate that said plurality of said paths in said fuzzy logic operation cannot be tested simultaneously with said same test vector when any of said plurality of rules has all fuzzy inputs feeding into said any of said plurality of rules flagged, otherwise designate that said plurality of said paths in said fuzzy logic operation can be tested simultaneously with said same test vector.

18. The testing method as recited in claim 10, wherein said rule evaluation process implements a MIN/MAX method of rule evaluation.

19. In a data processing system, a method for determining which paths in a fuzzy logic operation can be tested simultaneously with a same test vector, said method comprising the steps of:

(1) for a first path in a plurality of said paths in said fuzzy logic operation, (A) for each fuzzy input feeding a rule specified by said first path, (i) for each rule feeding a fuzzy output specified by said first path, (a) if both said rule specified by said first path and said each fuzzy input feeding said rule specified by said first path are on said first path, return to (i), otherwise assert a flag signal associated with said each fuzzy input feeding said rule specified by said first path;

(2) return to (i) if there are more rules feeding said fuzzy output specified by said first path, otherwise return to (A) if there are more fuzzy inputs feeding said rule specified by said first path, otherwise return to (1) to perform (A), (i), (a) and (2) on any remaining paths in said plurality of said paths in said fuzzy logic operation; and (3) assert a signal indicating that said plurality of said paths in said fuzzy logic operation cannot be tested simultaneously with said same test vector when any rule has all fuzzy inputs feeding into said any rule having an asserted flag signal, otherwise assert a signal indicating that said plurality of said paths in said fuzzy logic operation can be tested simultaneously with said same test vector.

20. A data processing system for determining which paths in a fuzzy logic operation can be tested simultaneously with a same test vector, said system comprising:

storage means for storing a template comprising a listing of a plurality of rules and fuzzy inputs corresponding to each of said plurality of rules;

for two or more of said paths to be evaluated to determine if said two or more of said paths can be tested simultaneously with said same test vector, means, coupled to said storage means, for flagging a particular one of said fuzzy inputs, stored within said storage means and feeding said plurality of rules contained within said two or more of said paths, when it is determined that a particular one of said plurality of rules contained within said two or more of said paths cannot assume a rule strength equal to a value of said particular one of said fuzzy inputs feeding said plurality of rules contained within said two or more of said paths; and means, coupled to said storage means, for determining that said two or more of said paths to be evaluated cannot be tested simultaneously with said same test vector when all of said fuzzy inputs pertaining to at least one of said plurality of rules have been flagged by said flagging means.

* * * * *